US012387535B2

(12) United States Patent
Duan et al.

(10) Patent No.: US 12,387,535 B2
(45) Date of Patent: Aug. 12, 2025

(54) CLOUD-BASED PLATFORM SERVER FOR VEHICLE DTC DATA ANALYZING, REPORTING AND RESPONDING

(71) Applicants: GM GLOBAL TECHNOLOGY OPERATIONS LLC, Detroit, MI (US); Northeastern University, Boston, MA (US)

(72) Inventors: Shiming Duan, Ann Arbor, MI (US); Yingjie Cai, Royal Oak, MI (US); Ming Hsiang Hong, Austin, TX (US); Srikanth Reddy Bandameedi, Georgetown, TX (US); Sambasiva Velama, Round Rock, TX (US); Xiaomeng Peng, Malden, MA (US)

(73) Assignees: GM GLOBAL TECHNOLOGY OPERATIONS LLC, Detroit, MI (US); Northeastern University, Boston, MA (US)

( * ) Notice: Subject to any disclaimer, the term of this patent is extended or adjusted under 35 U.S.C. 154(b) by 292 days.

(21) Appl. No.: 17/687,290

(22) Filed: Mar. 4, 2022

(65) Prior Publication Data

US 2023/0282039 A1   Sep. 7, 2023

(51) Int. Cl.
*G07C 5/08* (2006.01)
*G07C 5/00* (2006.01)

(52) U.S. Cl.
CPC ............ *G07C 5/0808* (2013.01); *G07C 5/008* (2013.01); *G07C 5/085* (2013.01)

(58) Field of Classification Search
CPC ....... G07C 5/0808; G07C 5/008; G07C 5/085
See application file for complete search history.

(56) References Cited

U.S. PATENT DOCUMENTS

| 5,951,611 A | * | 9/1999 | La Pierre ............ G05B 23/0278 |
| | | | 702/184 |
| 9,032,081 B1 | * | 5/2015 | North .................. H04L 67/1006 |
| | | | 709/227 |

(Continued)

FOREIGN PATENT DOCUMENTS

WO    WO-2021035506 A1 *   3/2021

OTHER PUBLICATIONS

Open source vehicle ECU diagnostics and testing platform, Mohseninia, University of Reading, Jul. 2021 (Year: 2021).*

(Continued)

*Primary Examiner* — Navid Z. Mehdizadeh
*Assistant Examiner* — Oliver Tan

(57) ABSTRACT

A cloud-based platform server includes a memory, a receiving module, and a reporting module. The memory stores a DTC configuration table including DTC rules and a DTC data table. The receiving module: receives DTC configuration information transmitted from a configuration server to the cloud-based platform server and DTC data uploaded from a data server to the cloud-based platform server, where at least some of the DTC data was originally generated by multiple vehicles; based on one or more selected vehicle platforms, parse the DTC configuration information and the DTC data; convert the parsed DTC configuration information to a standardized format and the parsed DTC data having different formats to a standardized format; generate or update the DTC configuration table based on the parsed and converted configuration information; and generate or update the DTC data table based on the parsed and converted DTC data and the DTC rules.

20 Claims, 6 Drawing Sheets

(56) References Cited

U.S. PATENT DOCUMENTS

| | | | | |
|---|---|---|---|---|
| 2012/0303205 | A1* | 11/2012 | Subramania | G05B 23/0278 |
| | | | | 701/29.8 |
| 2013/0061099 | A1* | 3/2013 | Radulescu | H04L 1/1858 |
| | | | | 714/708 |
| 2019/0258727 | A1* | 8/2019 | Schmotzer | G06F 40/242 |
| 2019/0304208 | A1* | 10/2019 | Chen | G07C 5/008 |
| 2020/0089487 | A1* | 3/2020 | Ramic | G06F 8/65 |
| 2020/0334927 | A1* | 10/2020 | Rozint | G07C 5/0841 |
| 2022/0164803 | A1* | 5/2022 | Kuehnle | G06Q 10/06398 |

OTHER PUBLICATIONS

The Implementation of OBD-II Vehicle Diagnosis System Integrated with Cloud Computation Technology, Jhou Springer 2014 (Year: 2014).*
Carista OBD2 app, Google Play 2019 (Year: 2019).*
Complete list of OBD Codes 2017 (Year: 2017).*
Innova DTC database May 15, 2021 (Year: 2021).*
Data-Driven Framework for Detecting Anomalies in Field Failure Data Singh et al IEEE 2011 (Year: 2011).*
WO2021035506A1 machine translation (Year: 2021)*

* cited by examiner

CLOUD-BASED PLATFORM SERVER FOR VEHICLE DTC DATA ANALYZING, REPORTING AND RESPONDING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle diagnostic trouble code (DTC) systems.

Modern vehicles include onboard diagnostic (OBD) interfaces to allow collection of diagnostic data from a vehicle. As an example, a service center may connect a service tool to a OBD interface of a vehicle and check if any DTCs have been set by one or more controllers of the vehicle. DTCs allow a technician to pinpoint what issue exists and where the issue is located. The DTCs may indicate, for example, whether there is a component failure, such as a bad sensor, or whether one or more thresholds have been exceeded. An exceeded flag can be set to indicate that a component has degraded and needs to be serviced and/or replaced. The ODB interface allows a technician to troubleshoot a vehicle more efficiently. DTCs and corresponding variables and values may be wirelessly collected from a vehicle via, for example, an automated remote data collection tool.

SUMMARY

A cloud-based platform server is disclosed including a memory, one or more receiving modules, and a reporting module. The memory is configured to store a diagnostic trouble code (DTC) configuration table and a DTC data table, where the DTC configuration table includes DTC rules. The one or more receiving modules are configured to: receive DTC configuration information transmitted from a configuration server to the cloud-based platform server and DTC data uploaded from one or more data servers to the cloud-based platform server, where at least some of the DTC data was originally generated by multiple vehicles; based on one or more selected vehicle platforms, parse the DTC configuration information and the DTC data to provide parsed configuration information and parsed DTC data; convert the parsed DTC configuration information having different formats to a first standardized format and the parsed DTC data having different formats to a second standardized format; at least one of generate or update the DTC configuration table based on the parsed and converted configuration information; and at least one of generate or update the DTC data table based on the parsed and converted DTC data and the DTC rules; and a reporting module configured to, based on the DTC configuration table and the DTC table, generate and download a DTC performance analysis report to one or more user devices.

In other features, the cloud-based platform server further includes a blacklist module. The memory is configured to store a blacklist table. The DTC configuration table includes blacklist rules. The blacklist module is configured to, based on the blacklist table and the blacklist rules, limit which data stored as part of the DTC table is permitted to be used in generating the DTC performance analysis report.

In other features, the cloud-based platform server further includes a data logging module that is configured to: time-stamp operations performed by the one or more receiving modules and the blacklist module; detect one or more irregularities in at least one of (i) the parsed and converted DTC configuration information, and/or (ii) the parsed and converted DTC data; and generate one or more of the blacklist rules based on the one or more irregularities.

In other features, the cloud-based platform server further including a data debugging and recovery module configured to receive a signal from the data logging module indicating detection of the one or more irregularities, and responsive to the detection, determining the cause of the one or more irregularities and recollecting at least one of DTC configuration information from the configuration server or DTC data from the one or more data servers to replace irregular data associated with the one or more irregularities.

In other features, the one or more receiving modules is configured to parse the DTC data received from the one or more data servers based on the DTC configuration information.

In other features, the one or more data servers include data servers. The one or more receiving modules include receiving modules configured to collect respective portions of the DTC data from the data servers. The receiving modules are configured, based on the parsed and converted DTC configuration information, to parse respective portions of the DTC data received from the data servers to provide the parsed DTC data.

In other features, the configuration server is implemented in a cloud-based local area network of the cloud-based platform server.

In other features, the DTC configuration information is uploaded from the configuration server to the cloud-based platform server. The configuration server is implemented separate from a cloud-based local area network of the cloud-based platform server.

In other features, the one or more receiving modules is configured to update the DTC configuration table more frequently than the DTC data table.

In other features, the receiving module is configured to update the DTC configuration table monthly and the DTC data table daily.

In other features, a diagnostic trouble code system is provided and includes: the cloud-based platform server; the configuration server; the one or more data servers; and one or more vehicle data collection tools configured to collect the DTC data from the vehicles and send the DTC data to the one or more data servers.

In other features, the one or more vehicle data collection tools include multiple vehicle data collection tools. The one or more data servers include data servers for collecting respective portions of the DTC data from the vehicle data collection tools.

In other features, a DTC performance analysis method is disclosed and includes: receiving via one or more receiving modules and at a cloud-based platform server (i) DTC configuration information transmitted from a configuration server to the cloud-based platform server, and (ii) DTC data uploaded from one or more data servers to the cloud-based platform server, where the DTC data was originally generated by vehicles; based on one or more selected vehicle platforms, parsing the DTC configuration information and the DTC data to provide parsed configuration information and parsed DTC data; converting the parsed DTC configuration information of different formats to a first standardized format; converting the parsed DTC data of different formats to a second standardized format; at least one of generating or updating a DTC configuration table based on the parsed and converted configuration information, where the parsed and converted configuration information includes DTC rules; at least one of generating or updating a DTC data table based on the parsed and converted DTC data and the DTC rules; and based on the DTC table, generating and downloading a DTC performance analysis report to one or more user devices.

In other features, the method further includes: storing the DTC configuration table and a blacklist table in memory, where the DTC configuration table includes blacklist rules; and based on the blacklist table and the blacklist rules, limiting via a blacklist module which data stored as part of the DTC table is permitted to be used in generating the DTC performance analysis report.

In other features, the method further includes: timestamping operations performed by the one or more receiving modules and the blacklist module; detecting one or more irregularities in at least one of (i) the parsed and converted DTC configuration information, or (ii) the parsed and converted DTC data; and generating one or more of the blacklist rules based on the one or more irregularities.

In other features, the method further includes: receiving a signal indicating detection of the one or more irregularities; and responsive to the detection, determining the cause of the one or more irregularities and recollecting at least one of DTC configuration information from the configuration server or DTC data from the one or more data servers to replace irregular data associated with the one or more irregularities.

In other features, the method further includes parsing via the one or more receiving modules the DTC data received from the one or more data servers based on the DTC configuration information.

In other features, the method further includes: collecting respective portions of the DTC data from multiple data servers, where the one or more data servers include the data servers; and based on the parsed and converted DTC configuration information, parsing respective portions of the DTC data received from the data servers to provide the parsed DTC data.

In other features, the configuration server is implemented in a cloud-based local area network of the cloud-based platform server.

In other features, the DTC configuration information is uploaded from the configuration server to the cloud-based platform server. The configuration server is implemented separate from a cloud-based local area network of the cloud-based platform server.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
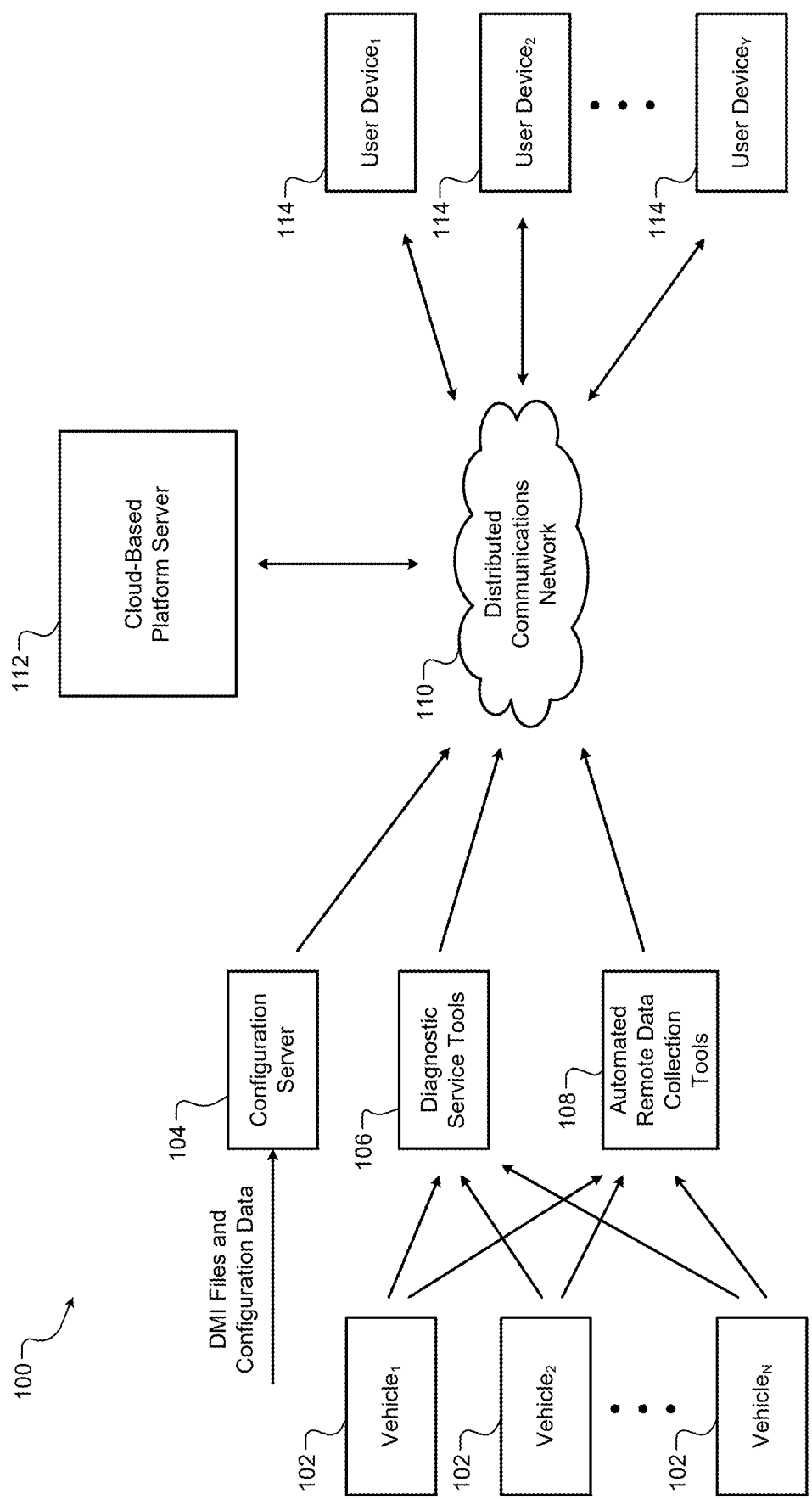
FIG. 1 is a functional block diagram of a portion of an example DTC system including a cloud-based platform server in accordance with the present disclosure.

Performance of vehicle DTC monitoring, analyzing and reporting can affect vehicle safety and warranty costs. DTC data may be collected by service tools and manually uploaded to a data center. It is also possible to use a telematic in-vehicle data recording device to connect to and automatically upload DTC data to the data center using, for example, a wireless fidelity (Wi-Fi) or cellular communication link. Traditionally, engineers manually prepare one-time DTC reports based on a small size of local (i.e., at vehicle) samples of data. This is a time consuming process, which can take hours to repeat. Sharing DTC reports and comparing DTC reports for different vehicle model years and vehicle programs can be cumbersome. The sharing and comparing of DTC reports can require the reprocessing of raw data. A vehicle program may refer to a vehicle type, brand and model made during a set number of years. It can also be difficult to detect and/or determine a root cause of an issue by manually inspecting and exploring through raw DTC data.

The examples set forth herein include a cloud-based platform server for collecting, parsing, formatting, filtering, analyzing and reporting DTC related information and data. An architecture and framework of the cloud-based platform server (also referred to as the platform server) ingests vehicle telemetric and non-telemetric data from different sources, and centralizes and standardizes the data in a centralized storage area for easy comparing, evaluating and sharing. The architecture and framework also enable intelligent DTC performance analysis. The platform server provides automated data pipeline and flexible model inferencing functions supporting a large volume of data and enables accurate and comprehensive monitoring of OBD field performance. Physics guided artificial intelligence (AI) techniques may be used to analyze DTC performance and potential issues.

The platform server collects DTC configuration information from one or more sources, parses configuration information into a standardized format for sharing, comparing and evaluating the configuration information from different vehicles having different vehicle models, different model years, etc. The platform server also collects DTC data from numerous vehicles, parses the DTC data into a standardized format for sharing, comparing and evaluating the DTC data from different vehicles having different vehicle models, different model years, etc. The examples include data logging, debugging, comparing, parsing, recovering and blacklisting, as well as other features, which are further described herein. The platform server helps to detect and identify DTC performance issues using, for example, fleet vehicle data in the field. The platform server provides a scalable solution to a large volume of data and comprehensive monitoring for OBD fleet performance evaluation.

The examples include converting engineer documents to DTC monitoring functions, which are scalable for different vehicle programs. The platform server supports a large volume of fleet data computing power.

Figure 2:
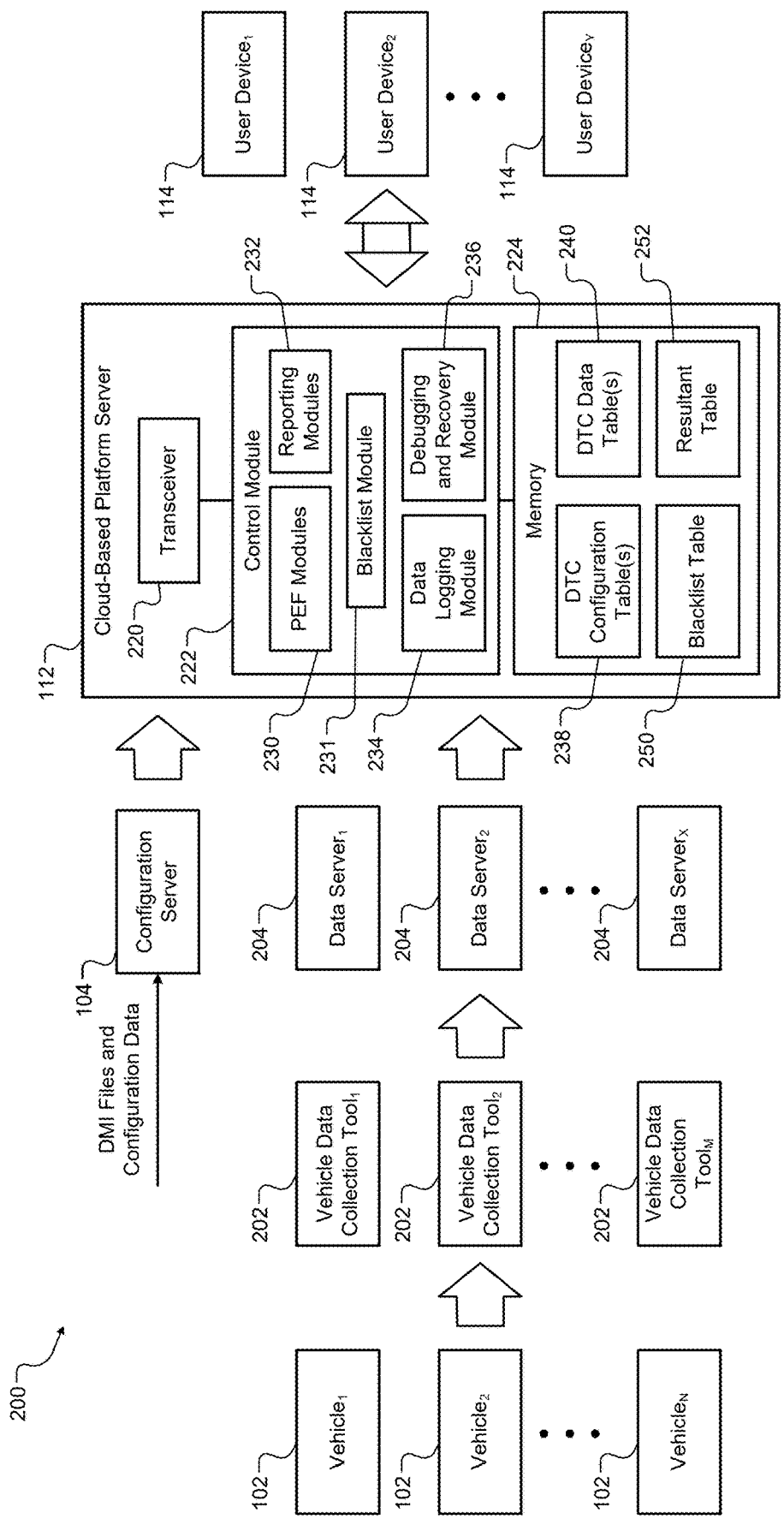
FIG. 2 is a functional block diagram of another portion of the DTC system of FIG. 1.

FIG. 1 shows a portion 100 of a DTC system that includes vehicles 102, a configuration server 104, diagnostic service tools 106, automated remote data collection tools 108, a distributed communication network 110, a cloud-based platform server 112 and user devices 114. The vehicles 102 may include personal vehicles, fleet vehicles, test vehicles, service vehicles, etc. The vehicles 102 include control modules that run DTC routines including monitoring vehicle systems and components and generate DTCs, based on the information monitored and data collected. The DTCs, the information monitored, and the data collected are reported from the vehicles to the diagnostic service tools 106 and/or the automated remote data collection tools 108, which in turn report the DTCs, the information monitored, and the data collected directly to the cloud-based platform server 112 and/or to intermediate servers. The DTCs may include engine diagnostic codes, electrical system diagnostic codes, vehicle system diagnostic codes, and/or other diagnostic codes. Data from hundreds to thousands of vehicles may be collected. Examples of intermediate servers are shown in FIG. 2. The automated remote data collection tools 108 may be implemented at for example a central office and used by a vehicle manufacturer, a service provider, a fleet manager, and/or other end user to monitor states of the vehicles 102. The automated remote data collection tools 108 may be telemetric vehicle data acquisition tools.

The configuration server 104 collects configuration information including DTC rules, DTC variables, DTC status bits, DTC measurements, DTC parameters, calibration values and thresholds and/or other information pertaining to DTCs and corresponding routines. A DTC rule refers to a routine performed by a controller to monitor certain information, take certain measurements, and generate a DTC based on information collected and whether one or more predetermined conditions exist. For example, a DTC associated with a temperature sensor may be generated when: a temperature sensor has an improper output signal; does not output a signal; or generates an irregular output signal (e.g., the output signal exceeds a threshold or is outside of a normal operating range). DTC variables may refer to the names of routines and/or parameters to be generated.

A couple of examples of DTC variables are a figure of merits (FoM) and an in-use monitoring performance ratio (IUMPR). A FoM is an indication of how long until service is needed and/or a level of degradation of a system and/or component. A FoM may be a percentage between 0-100%, where the higher the percentage, the closer a corresponding DTC will be set. The IUMPR refers to a ratio of a numerator over a denominator, where the numerator is the number of times a vehicle has been operated such that all monitoring conditions necessary for a specific monitor to detect a malfunction, and the denominator is a counter which increments on a particular drive cycle if the standard drive cycle definition conditions have been met. The FoM and the IUMPR are example metrics that may be evaluated by the user devices 114.

DTC status bit may be binary; a '0' when not set and a '1' when set. DTC parameters may refer to parameters monitored when determining whether to set a DTC status bit. A single DTC status bit may be associated with multiple DTC parameters indicating if there is a historical DTC, or if the test is passed since code is clear, etc. The DTC rules indicate what parameters to monitor and based on what conditions to set a DTC status bit HIGH.

The configuration server 104 collects DTC data management interface (dmi) files and DTC configuration information and provides these files and configuration information to the cloud-based platform server 112. The configuration server 104 extracts engineering specifications from received files and converts the specifications to DTC rules (or DTC functions) for data processing. The files and/or configuration information received at the configuration server 104 may be provided by one or more of the user devices 114, a server configured to store engineering specifications, or other device. The dmi files and the configuration information may each include (i) DTC rules (or routines) and corresponding DTC variables and DTC parameters that are to be implemented and monitored, (ii) DTC and/or vehicle system calibration values to be set, and (iii) DTC and/or vehicle system thresholds based on which statuses of whether certain conditions exist are to be determined.

The cloud-based platform server 112 (also referred to as simply the platform server 112) may be implemented as part of a cloud-based local area network separate from the configuration server 104 and the tools 106, 108 and user devices 114. The cloud-based platform server 112 collects DTC configuration information from (i) the configuration server 104 and/or other configuration servers, and (ii) DTC data from the tools 106, 108 and/or intermediate servers. The platform server 112: collects the configuration information and DTC data; parses the configuration information and DTC data based on DTC rules; formats the configuration information and DTC data into standardized formats; filters the configuration information and DTC data; blacklists certain data; logs jobs performed; debugs jobs performed; performs data recovery; and generates DTC performance analysis reports. This allows for the configuration information and DTC data from different sources to be filtered, compared, combined and evaluated. The DTC performance analysis reports are sent to the user devices 114. The user devices 114 may include personal devices, devices of engineers of the vehicles 102, devices of dealer managers, devices of fleet managers, devices of service centers, etc. The user devices 114 may include mobile phones, laptop computers, tablets, personal computers, servers, etc. The DTC performance analysis reports are customable for the end user and application.

A traditional personal computer (PC) based tool: processes only local files and has long processing time. The data collected and generated by the PC can be difficult to share. As an example, 400 vehicle trips may take 8-10 hours to load. In order to account for new data and/or to share data, the data needs to be reprocessed. The data may not be supported by automated remote data collection tools performing data logging and telemetry operations. The PC based tool has basic and limited filtering and visualization.

The platform server 112 disclosed herein however is configured to ingest and centralize a large amount of data from hundreds-thousands of vehicles collected via manual service and/or automated telemetric data recorders. The platform server 112 is able to generate pre-processed DTC performance analysis reports in a cloud-based environment with a minimal amount of load time (e.g., a few seconds) of the DTC performance analysis reports at the user devices 114. The reports are provided based on dynamic filtering and intelligent correlation functions. The DTC system 100 provides a pipeline that, in one embodiment, has periodic (e.g., daily) refreshments of the DTC performance analysis reports. The platform server 112 allows for OBD development and validation by quickly providing updated reports to engineering devices. The DTC performance analysis reports allow a service technician and/or engineer to quickly and easily be informed of DTCs and/or other related information and be alerted of and/or detect root causes of the DTCs. The platform server 112 is scalable for (i) various different vehicle programs and different sources of field data, and (ii) processing of a large volume of field data.

FIG. 2 shows another portion 200 of the DTC system that includes the vehicles 102, the configuration server 104, vehicle data collection tools 202, data servers 204, the cloud-based platform server 112, and the user devices 114. The vehicle data collection tools 202 may be include the diagnostic service tools 106 and/or the automated remote data collection tools 108 of FIG. 1 and/or other vehicle data recorders. The vehicle data collection tools 202 collect DTC data from the vehicles 102 and provide the DTC data respectively to the data servers 204. The vehicle data collection tools 202 may each collect data from one or more vehicles. In one embodiment, the tools 108 and 202 of FIGS. 1-2 are configured to: search for DTC FoM and/or IUMPR variables and incorporate the variables in a DTC FoM/IUMPR table; collect and/or decode DTC status bits and put the DTC status bits in a DTC bit status table; and format, decode, reconstruct, concatenate, combine, and/or convert DTC data to a standardized format and incorporate the DTC data in the standardized format in a DTC data table. One or more of these operations may be implemented at the servers 112 and/or 204.

A data server 204 may be provided for each vehicle data collection tool 202. The number of data servers 204 may be the same or different than the number of vehicle data collection tools 202. The data servers 204 store the DTC data, which may be in different formats for different vehicles, vehicle models, vehicle model years, vehicle types, etc.

The platform server 112 may be implemented as part of a cloud-based local area network separate from the tools 202, data servers 204 and user devices 114. In one embodiment, the data servers 204 are implemented in the cloud-based local area network. The platform server 112 may be centrally located relative to vehicles being monitored and includes a transceiver 220, a control module 222, and a memory 224. The transceiver 220 may receive configuration information from the configuration server 104 and DTC data from the data servers 204. The control module 222 may include parsing, extracting and formatting (PEF) modules 230 (also referred to as receiving modules), a blacklist module 231, reporting modules 232, a data logging module 234 and a debugging and recovery module 236. The memory 224 may store one or more DTC configuration tables 238 with DTC configuration information and one or more DTC data tables 240. The DTC configuration tables 238 may include any DTC configuration information disclosed herein. The DTC data tables 240 may include any DTC data referred to herein.

Each of the PEF modules 230 parse and extract configuration information from the configuration information stored in the configuration server 104. For example, one of the PEF modules 230 may parse and extract configuration information associated with a particular DTC and then format that information to be in a first standardized format, which can then be compared to other DTC configuration information from the same or different sources. The DTC configuration information from each source may be formatted to be in the first standardized format.

Each of the PEF modules 230 parse and extract data from the data stored in a respective one of the data servers 204. For example, one of the PEF modules 230 may parse and extract data associated with a particular DTC and then format that data to be in a second standardized format, which can then be compared to other DTC data collected from other vehicles. The DTC data from each vehicle may be formatted to be in the second standardized format.

The blacklist module 231 may generate one or more blacklist tables 250 based on blacklist rules as further described below. The blacklist module 231 may generate one or more resultant tables 252 based on differences between the DTC data tables 240 and the blacklist tables 250 as further described below.

The reporting modules 232 (also referred to as transmitting modules) generate customizable DTC performance analysis reports for the user devices 114. The reporting modules 232 may implement physics guided artificial intelligence (AI) techniques to analyze DTC performance and potential issues and generate reports based on the results of the analysis. The DTC performance analysis reports may include graphs, bar graphs, charts, sensor values, parameter blocks, statistical tables, comparisons and/or means of data from multiple vehicles, etc. The reports may indicate DTC performance values and be used for DTC performance analysis. The reports may be used by engineers, vehicle owners, fleet managers, vehicle dealers, etc. The reports may provide an indication of which systems and/or components need servicing and/or indicate how a vehicle should be serviced. The reporting modules 232 operate as visualization tools that aid in quickly and efficiently visualizing DTC issues.

The DTC performance analysis reports may be used by (i) end users to determine when to service vehicles, and/or (ii) vehicle control modules (e.g., the vehicle control module of FIG. 4) of autonomous vehicles to determine when a vehicle should be serviced. The vehicle control module may then drive the vehicle to a service station and/or limit operations of the vehicle until serviced. This may include: limiting driving speeds, acceleration rates, and operation of certain devices and/or components; generating alert signals indicating service needed, the issue(s) detected, which vehicle operations are limited, and/or how the operations are limited; etc. The reports may be used by engineers to correct and/or adjust DTC rules, attributes, variables, calibrations and/or thresholds for vehicle programs and/or upcoming vehicle programs. This may be done to, for example, prevent false alarms, to implement software patches, etc. The reports may be utilized by a fleet manager that is monitoring multiple vehicles and planning service periods for the vehicles. The reports can alert users of issues to prevent further degradation of vehicle systems, devices and components. A dealer and/or fleet manager may order service parts and schedule maintenance based on the reports.

The data logging module 234: timestamps and stores operations performed and corresponding data generated; detects irregularities; and reports the irregularities to the debugging and recovery module 236. The debugging and recovery module 236: determines when and/or where an irregularity has occurred; discards and/or ignores data collected during periods of irregularities; and attempts to recover data for these periods and/or regenerate data to replace the irregular data created during these periods.

Operations of the PEF modules 230, reporting modules 232, data logging module 234 and debugging and recovery module 236 are further described below with respect to FIGS. 4-6.

During operation, the vehicle data collection tools 202 may implement data dumps to collect large amounts of DTC raw and/or processed data from the vehicles 102. The configuration server 104 searches memory of the configuration server 104, for example, for network attached storage (NAS) structured folders including dmi and/or configuration files received from user devices (e.g., devices operated by engineers). Engineers may create the files and/or folders to control the parsing of data, which is performed at control module 222 of the platform server 112 when receiving data from the servers 204. The parsing may include separating DTC data associated with a particular vehicle program from other DTC data. In one embodiment, the control module 222 may: extract DTC configuration table information for each vehicle program and store as a respective DTC configuration table in the memory 224; and extract DTC data for each vehicle program and store as a respective DTC data table in the memory 224.

The servers 204 may monitor daily loaded data from the vehicles 102 and match the DTC data with event names and vehicle programs and store the DTC data, event names and vehicle program information as raw data tables and/or records in memory of the servers 204. The control module 222 may extract the raw data tables and/or records from the servers 204 for each vehicle program and store as respective DTC data tables in the memory 224.

The cloud-based platform server 112 may receive user inputs from the user devices 114 for adjusting the collecting, parsing, filtering and converting of DTC configuration information and DTC data. The cloud-based platform server 112 may also receive user inputs from the user devices 114 for customizing the DTC performance analysis reports. DTC rules, attributes, variables, and/or other DTC configuration information. may be remotely adjusted. This may include adjusting calibration values and thresholds based on which DTC performance analysis is performed. The vehicles 102 and/or the configuration server 104 may receive updated DTC rules, attributes, variables, calibration values, thresholds, etc. from the control module 222 and/or the user devices based on the DTC performance analysis reports and/or reported information. This allows an engineer to quickly adjust, for example, boundaries based on which DTCs are set and obtain updated reports.

Figure 3:
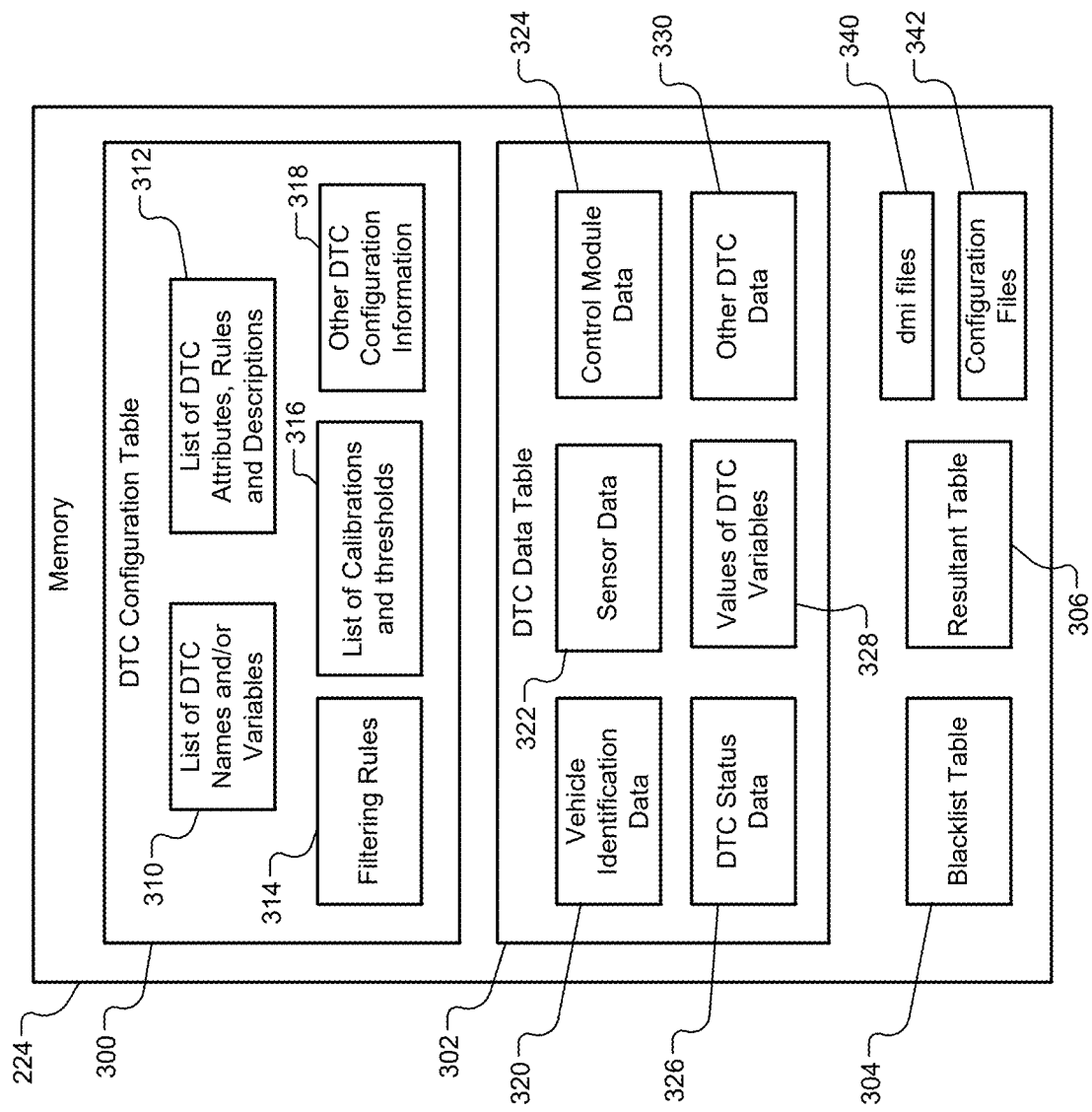
FIG. 3 is a function block diagram of a memory of the cloud-based platform server of FIG. 1 in accordance with the present disclosure.

FIG. 3 shows the memory 224 of the cloud-based platform server 112. The memory 224 may include non-volatile memory. In the example shown, the memory 224 is shown storing a single DTC configuration table 300 and a single DTC data table 302. The memory 224 may store additional DTC configuration tables and DTC data tables. As an example, a different DTC configuration table and a different DTC data table may be stored for different vehicle types, models, model years, etc. The memory 224 may also store a blacklist table 304 and a resultant table 306. Additional blacklist tables and/or resultant tables may be stored for different vehicle types, models, model years, etc.

The DTC configuration table 300 may include a list of DTC names and/or variables 310, a list of DTC attributes, rules, and descriptions 312, filtering rules 314, a list of calibrations and thresholds 316, and/or other DTC configuration information 318. The DTC names and/or variables 310 include the above-stated variables FoM, IUMPR, and other DTC variables. The DTC configuration information may include a geographical region identifier, a vehicle program, a model year, parameters being monitored, thresholds, timestamps, rules, default values, devices enabled, devices disabled, etc. The DTC configuration table 300 may be an unpivot table supporting different control modules (or electronic control units (ECUs)), vehicle programs, model years, etc. The control modules may include engine control modules, transmission control modules, body control modules, vehicle integration control modules and other vehicle control modules.

The list of DTC attributes, rules, and descriptions 312 may describe what each DTC routine is determining and which DTC variables are involved for that routine, what parameters are monitored for that routine, and what parameters are calculated for that routine. The rules may include conditions that are checked and monitored to determine whether the corresponding DTC should be set. Each DTC may have one or more associated rules and/or one or more associated conditions. The DTC attributes may include calibrations values and/or thresholds for that DTC.

The filtering rules 314 refer to rules for ignoring, removing and/or discarding collected data. Each DTC may have one or more filtering rules. The filtering rules may be associated with filtering out default values and/or data collected during a pre-mature learning period. For example, data collected during a first predetermined number of miles (e.g., 500 miles) of a new vehicle may be ignored and/or discarded while the DTC monitoring system of that vehicle is learning normal operating states and ranges of vehicle systems and components. The control module 222 of FIG. 2 may implement artificial intelligence (AI) learning of the normal operating states and ranges. Certain conditions may need to be satisfied before a DTC routine is enabled. Thus, default values and/or empty set entries may be filtered out. As an example, a default value may be a negative value indicating that the value should be ignored.

The filtering rules may also include rules associated with creating and updating the blacklist table 304 and the resultant table 306. The blacklist table 304 may include DTC data that is to be ignored and is unable to be removed from the DTC data table 302. The DTC data that is unable to be removed may be stored as records, rows or columns of the DTC data table 302, and/or in another format. The blacklist table 304 may include data that was created during, for example, a period when irregularities have occurred. The resultant table 306 may be a difference between the blacklist table 304 and the DTC data table 302. In one embodiment, the resultant table 306 is not generated. The blacklist table 304 may include vehicle identification information, ECU parameters, timestamps, disable and/or discard reasons, record created timestamps, etc. The blacklist table 304 may be created by applying exclusion rules to the DTC data table 302. The blacklist tables 250 and the resultant tables 252 of FIG. 2 may be similarly generated.

The list of calibrations and thresholds 316 include calibration values that are set, adjusted and/or monitored for each DTC. The DTC routines may be executed based on the calibration values. Status of conditions are determined based on the thresholds. The thresholds may include maximum vales, minimum vales, and be associated with predetermined operating ranges.

The DTC data table 302 may be a combination of (i) a data table of data received from service tools, and (ii) a data table of data received from automated remote data collection tools. The automated remote data collection tools may wirelessly and remotely collect DTC data from vehicles. The data tables of data from the service tools and automated remote data collection tools may include similar information such as: vehicle identification information; filenames; vehicle program; model year; sensor and/or component status values; calibration values; parameter values; timestamps; ECU parameter values, event types, trip names, trip times, etc. The DTC data table 302 may include vehicle identification data 320, sensor data 322, control module data 324, DTC status data 326, values of DTC variables 328, and/or other DTC related data 330. The vehicle identification data 320 may include vehicle program names, model names, model years, and vehicle identification numbers (VINs). The sensor data 322 may include data from any of the sensors on the vehicles being monitored. The DTC data table 302 may be an unpivot table supporting different control modules (ECUs), vehicle programs, model years, etc.

The control module data 324 may include data collected by and/or generated by any of the control modules and/or other modules on the vehicles being monitored. The DTC status data 326 may include binary values indicating whether the DTCs have been set. The values of DTC variables 328 may include the values of the DTC variables being monitored for the DTCs of concern. The other DTC data 330 may include trip names, dates, times, timestamps, component names, module names, raw data collected from the vehicles being monitored, etc.

The memory 224 may store one or more dmi files 340 for each vehicle program. The dmi files may include any of the information and data stored in the tables 300, 302, 304 and 306 and/or links to the information and data stored in the tables 300, 302, 304 and 306. The platform server 112 of FIGS. 1-2 may extract one or more of the dmi files for a particular vehicle program when generating DTC performance analysis reports for that vehicle program.

Referring to FIGS. 1-3, the platform server 112 may perform raw data dumps that include receiving raw data associated with DTCs from the tools 106, 108, 202 and/or servers 104, 204 and store the data in the memory 224. The platform server 112, when generating reports, may: (i) extract a list of implemented DTCs from the memory 224 for one or more specific vehicle programs and associated descriptions and calculation methods defined in one or more dmi files; (ii) locate DTC variables for the DTCs in the memory 224, which may be defined in the one or more dmi files; (iii) locate DTC rules in the memory 224 for the DTCs and filter out default and pre-mature learning values; (iv) locate thresholds and corresponding calibration values; and (v) parse and group DTC data based on the located DTC rules, thresholds and calibration values. The DTC variables may include variables defined in the one or more dmi files and used for variable calculations, such as FoM and/or IUPR calculations. The calibration values may be stored in configuration files 342.

In one embodiment, there is a one-to-many relationship between the DTCs and data collected for the DTCs. A DTC may have corresponding rules and many associated parameters, values, etc. that are monitored, generated and/or stored for the DTC. The DTC configuration table 300 includes the DTC and rules, whereas the DTC data table 302 includes the parameters associated with the DTC and rules. The DTC data table 302 can be significantly larger than the DTC configuration table 300.

Figure 4:
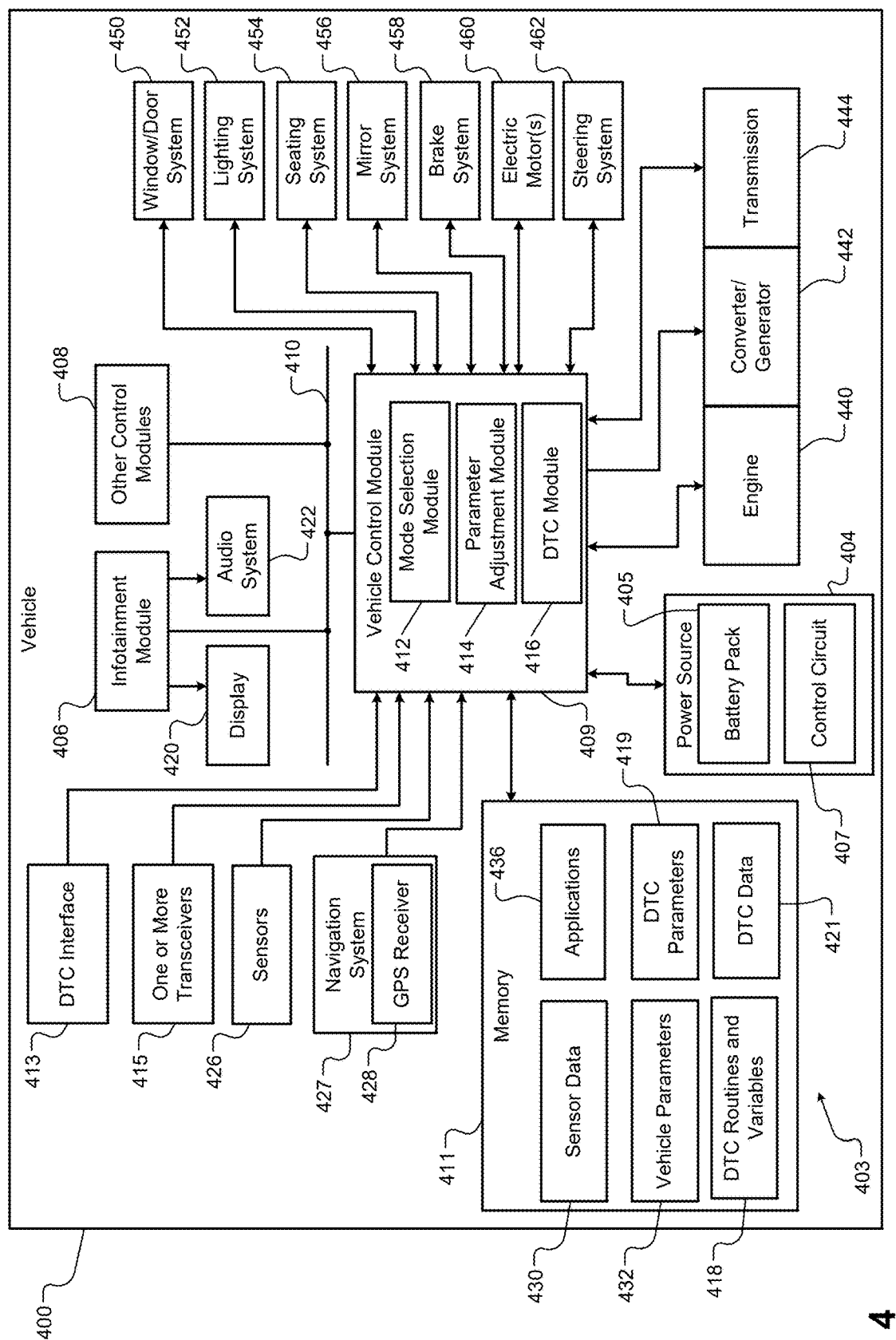
FIG. 4 is a function block diagram of a vehicle of the DTC system of FIG. 1 in accordance with the present disclosure.

FIG. 4 shows a vehicle 400 of the DTC system of FIGS. 1-2. Any and/or all of the vehicles 102 of FIGS. 1-2 may be implemented similarly as the vehicle 400. The vehicle 400 may be a partially or fully autonomous vehicle. The vehicle 400 includes a DTC system 403 including the vehicle control module 409, memory 411, DTC interface 413, and transceivers 415. The DTC system 403 may also include alarm, alert, status reporting devices, sensors, modules, etc. Some of which are referred to below. The vehicle 400 includes a power source 404, an infotainment module 406 and other control modules 408. The power source 404 includes a battery pack 405 and a control circuit 407. The modules 409, 406, 408 may communicate with each other and have access to the memory 411 via one or more buses 410, such as a controller area network (CAN) bus and/or other suitable interfaces.

The vehicle control module 409 controls operation of vehicle systems. The vehicle control module 409 may include a mode selection module 412, a parameter adjustment module 414, a DTC module 416 as well as other modules. The mode selection module 412 may select a vehicle operating mode. The parameter adjustment module 414 may be used to adjust parameters of the vehicle 400. The DTC module 416 implements DTC routines (or methods) and when certain conditions arise sets one or more corresponding DTCs. The DTC module 416 may: access DTC routines and variables 418 stored in the memory 411; monitor DTC parameters 419, which may be stored in the memory 411; generate DTC data 421, which may also be stored in the memory 411; and report the DTC data to one or more of the tools 106, 108, 202, which may then share the DTC data with one or more of the servers 204 of FIGS. 1-2. The servers 204 share the DTC data with the platform server 112 of FIGS. 1-2.

The vehicle 400 may further include: a display 420; an audio system 422; one or more transceivers 415 including sensors 426; and a navigation system 427 including a global positioning system (GPS) receiver 428. The sensors 426 may include sensors, cameras, objection detection sensors, temperature sensors, accelerometers, vehicle velocity sensor, and/or other sensors. The GPS receiver 428 may provide vehicle velocity and/or direction (or heading) of the vehicle and/or global clock timing information.

The memory 411 may store sensor data 430 and/or vehicle parameters 432, and applications 436. The applications 436 may include applications executed by the modules 406, 408, 409. Although the memory 411 and the vehicle control module 409 are shown as separate devices, the memory 411 and the vehicle control module 409 may be implemented as a single device.

The vehicle control module 409 may control operation of an engine 440, a converter/generator 442, a transmission 444, a window/door system 450, a lighting system 452, a seating system 454, a mirror system 456, a brake system 458, electric motors 460 and/or a steering system 462 according to parameters set by the modules 406, 408, 409. The vehicle control module 409 may set some of the parameters based on signals received from the sensors 426. The vehicle control module 409 may receive power from the power source 404, which may be provided to the engine 440, the converter/generator 442, the transmission 444, the window/door system 450, the lighting system 452, the seating system 454, the mirror system 456, the brake system 458, the electric motors 460 and/or the steering system 462, etc. Some of the vehicle control operations may include unlocking doors of the window/door system 450, enabling fuel and spark of the engine 440, starting the electric motors 460, powering any of the systems 450, 452, 454, 456, 458, 462, and/or performing other operations as are further described herein.

The engine 440, the converter/generator 442, the transmission 444, the window/door system 450, the lighting system 452, the seating system 454, the mirror system 456, the brake system 458, the electric motors 460 and/or the steering system 462 may include actuators controlled by the vehicle control module 409 to, for example, adjust fuel, spark, air flow, steering wheel angle, throttle position, pedal position, door locks, window position, seat angles, etc. This control may be based on the outputs of the sensors 426, the navigation system 427, the GPS receiver 428 and the above-stated data and information stored in the memory 411.

The vehicle control module 409 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information. The vehicle control module 409 may share this information and the vehicle operating mode with the control circuit 407. The control circuit 407 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The control circuit 407 may determine connected configurations of the cells and corresponding switch states based on the parameters determined by the vehicle control module 409 and/or the control circuit 407. In one embodiment, the vehicle control module 409 and the control circuit 407 are implemented as a single control module.

Figure 5:
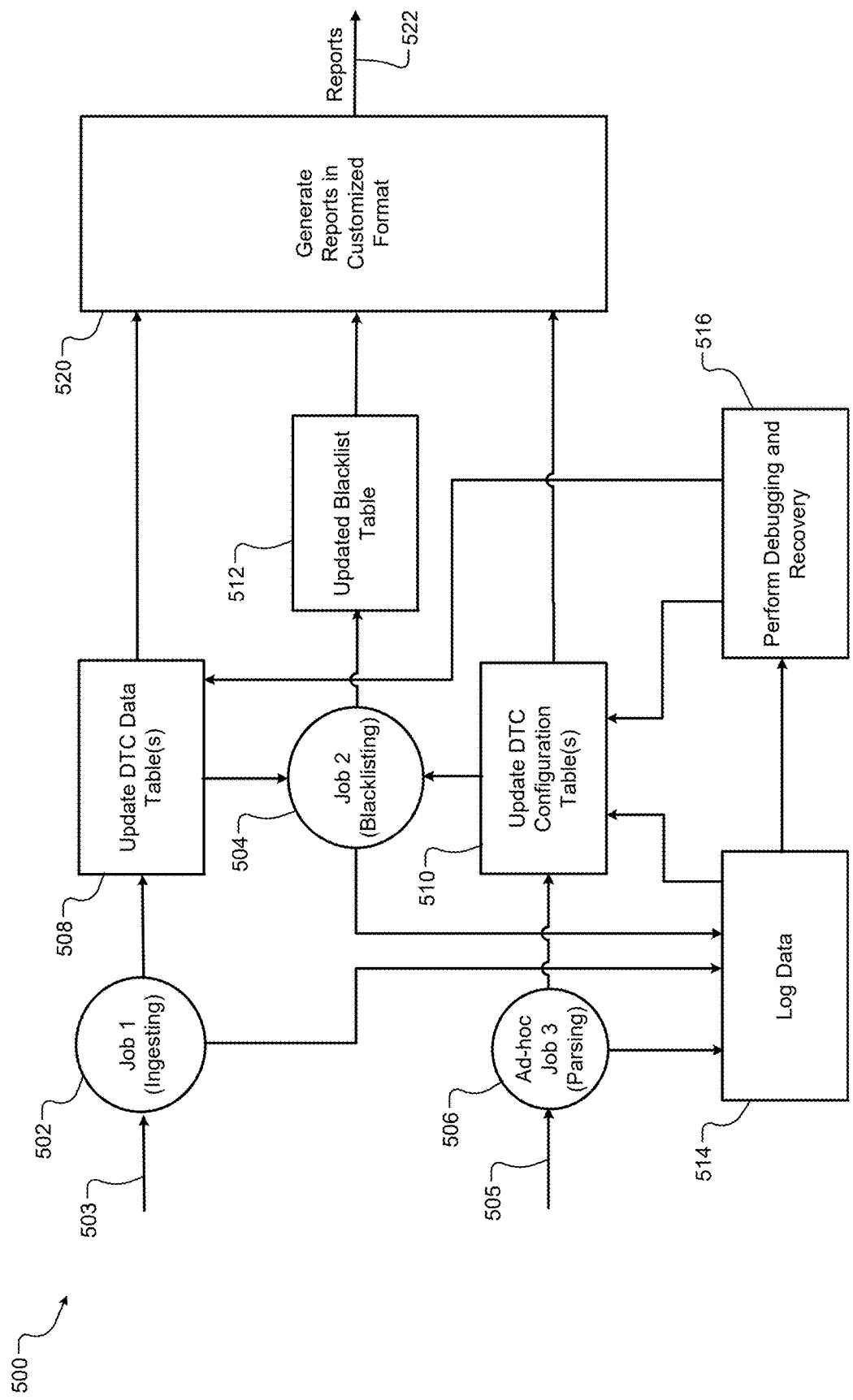
FIG. 5 is a DTC process diagram in accordance with the present disclosure.

Referring now to FIGS. 2-3 and FIG. 5, which shows a DTC process diagram 500 illustrating a DTC process that may be implemented by the control module 222 of the platform server 112. The DTC process performs automated tabularizing of DTC configuration information and DTC data and includes performing jobs, which are operational methods implemented by the control module 222. The jobs may be performed periodically. As an example, three jobs are shown. The first and second jobs Job 1 and Job 2 may be performed daily and the third job Ad-hoc Job 3 may be performed once a month (or monthly). The jobs are designated 502, 504, and 506.

When performing the first job 502, the PEF modules 230 receives DTC data 503 from the tools 106, 108 and 202 and/or the servers 204 of FIGS. 1-2. DTC data 503 is collected, parsed, filtered and converted to corresponding data in a first standardized format to provide resultant DTC data. The DTC data table 302 is updated based on the resultant DTC data, as represented by box 508. The PEF modules 230 may select a subset of received DTC data based on the one or more vehicle platforms of concern, and/or based on other vehicle identification information. A daily drop may occur to collect the DTC data 503. The collected DTC data 503 may be parsed, filtered, and converted and stored based on the vehicle program as part of the DTC data table 302. The DTC data table 302 may include DTC data for a particular vehicle program or may be partitioned, where each partition includes DTC data for a respective vehicle program. The first job 502 may be performed by the PEF modules 230. The first job may be performed at the end of each driving cycle, multiple times during each driving cycle, or once per a predetermined number of driving cycles. A driving cycle may refer to a driving cycle of a particular vehicle, a driving cycle of a predetermined number of vehicles of a particular vehicle platform, or other predetermined driving cycle.

When performing the third job 506, which may be an ad-hoc job, the PEF modules 230 parses and converts the configuration information 505 from the configuration server 104 into a second standardized format based on the vehicle program. The PEF modules 230 may select a subset of receive configuration information based on the one or more vehicle platforms of concern, and/or based on other vehicle identification information. The converted configuration information is stored as part of the DTC configuration table 300. This is represented by box 510. The DTC configuration table 300 may include configuration information for a particular vehicle program or may be partitioned, where each partition includes configuration information for a respective vehicle program. The third job 506 may be performed by the PEF modules 230.

When performing the second job 504, the blacklist module 231 performs blacklisting operations to update and/or generate the blacklist table 304 to include blacklisted data. This is represented by box 512 and is based on the blacklist filtering rules. The blacklist table 304 may be generated based on the DTC data in the DTC data table 302 and blacklist rules, which may be stored as part of the DTC configuration table 300. The blacklist rules may be generated based on irregularities detected during data logging and or generated as a result of debugging. The blacklist rules may be pre-generated and stored, may be generated by one or more of the modules 222, 234, 236 and/or updated based on user inputs.

The data logging module 234 is configured to performs data logging during jobs 502, 504 and 506. This includes timestamping and recording operations performed. This may include detecting irregularities in collected data and is represented by box 514. Irregularities may be detected when, for example, values are out of predetermined ranges, are of an improper format, are unrecognizable, etc. Irregularities may be detected when a value is expected and (i) no value was received and/or entered, and/or (ii) unexpected data was received and entered. Irregularities may include corrupted data and/or be detected based on inconsistencies in the data. An irregularity may include duplicated received data, duplicative data stored in memory, and/or other errors. Irregularities may also occur due to errors in parsing received data. The data logging module 234 may report the irregularities and corresponding timestamps including start and end timestamps associated with irregular period to the debugging and recovery module 236. The data logging module 234 may generate blacklist rules based on the detected irregularities including the rules to ignore irregular data and/or empty set entries. If permitted, the data logging module 234 may discard irregular data. The blacklisting rules may be stored as part of the DTC configuration table 300.

The data debugging and recovery module 236 performs debugging and data recovery operations in attempt to replace the irregular data with valid data. The data debugging and recovery module 236 determines the cause of the irregularity and recollects the DTC configuration information and/or the DTC data associated with the collected irregular data in an attempt to replace the irregular data. This may occur after the configuration server 104 and/or data servers 204 have recollected configuration information and/or DTC data. The control module 222 may signal the servers 104, 204 to recollect configuration information and DTC data.

Determining the cause of the irregularity includes: determining the start and stop timestamps of the irregularity period; determining whether the irregularity is associated with configuration information and/or DTC data; determining whether the irregularity is associated with collecting, parsing, filtering and/or converting of configuration information; and/or determining whether the irregularity is associated with collecting, parsing, filtering and/or converting of DTC data. The recollected data is DTC configuration information and/or DTC data generated and/or collected at a day and time subsequent to generation and/or collection of the irregular data. The data debugging and recovery module 236 may generate blacklisting rules and store the rules as part of the DTC configuration table 300. The recollected data is analyzed to determine whether the data is valid and if valid is stored as part of the corresponding one or more of the tables 300, 302. Operations performed by the data debugging and recovery module 236 are represented by box 516.

The data logging module 234 and the debugging and recovery module 236 monitor for data duplication and prevent storage of duplicated data. This is done to minimize processing of DTC data.

The reporting modules 232 generate DTC performance analysis reports based on the tables 300, 302, 304 and customized reporting settings for the user devices 114. The customized settings may include default settings, preselected settings, and/or settings set based on user inputs. This is represented by box 520 and includes generating reports 522.

The jobs 502, 504 and 506, the data logging, the debugging, and the data recovering include automated scheduled service functions that are periodically performed to refresh the tables 300, 302, 304 and generate reports.

Figure 6:
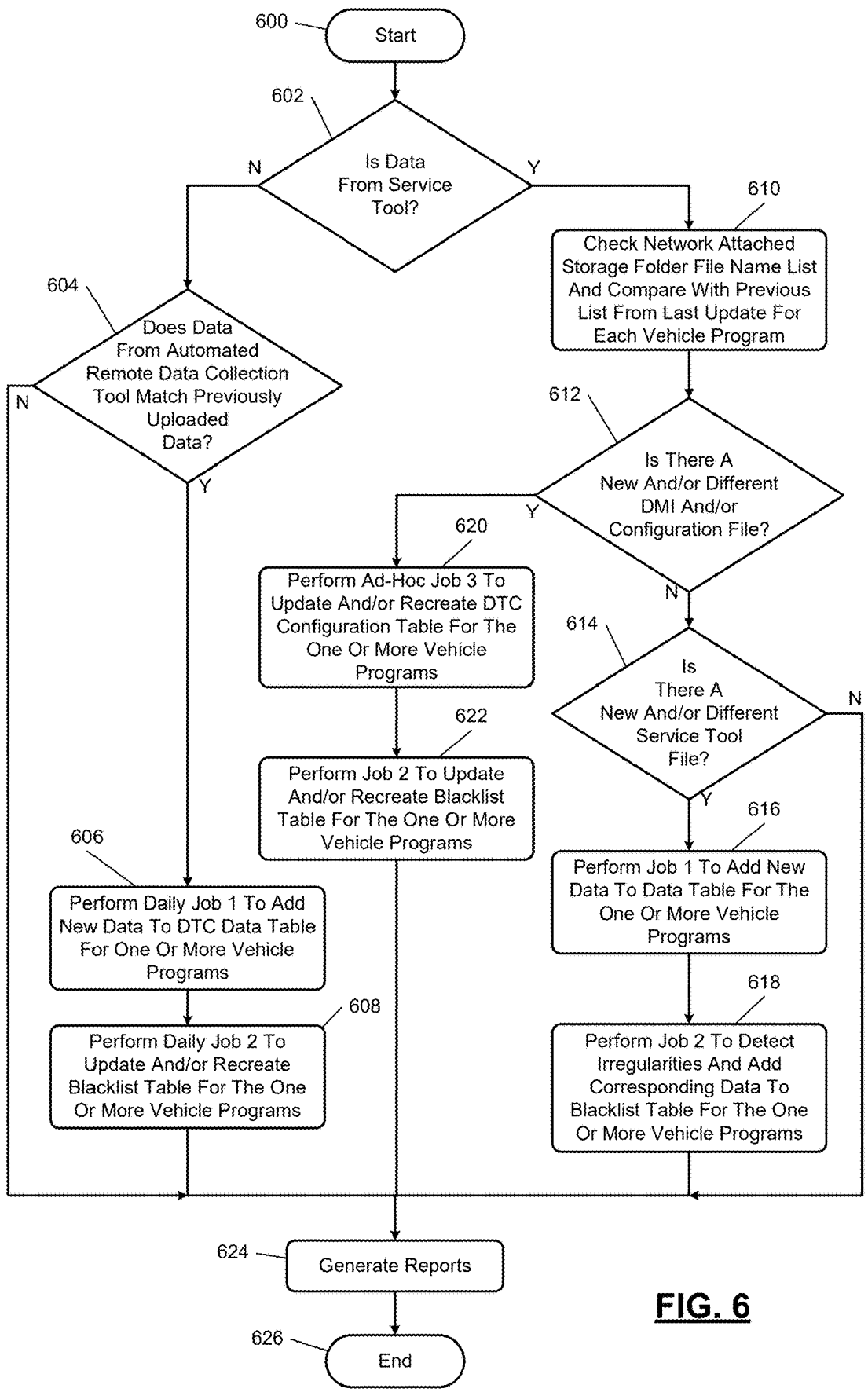
FIG. 6 illustrates a DTC performance analysis method in accordance with the present disclosure.

FIG. 6 shows a DTC performance analysis method of operating the DTC system of FIGS. 1-2. Although the following operations are primarily described with respect to the implementations of FIGS. 1-4, the operations may be easily modified to apply to other implementations of the present disclosure. The operations may be iteratively performed. The method may begin at 600. At 602, the control module 222 determines whether received data is DTC data received from a service tool. As an example, the received DTC data may be received from a service tool, an automated remote data collection tool, or other data recorder. The following operations are directed to when the received DTC data is from a service tool or an automated remote data collection tool. If the DTC data is not from a service tool. Operation 604 may be performed, otherwise operation 610 may be performed.

At 604, the control module 222 determines whether the received DTC data matches previously uploaded data. The DTC data may be wirelessly received from an automated remote data collection tool. If the DTC data does not match, operation 624 may be performed, otherwise operation 606 may be performed.

At 606, the control module 222 performs the first job 502 of FIG. 5 to add new data to the DTC data table 302 for one or more vehicle programs of interest. At 608, the control module 222 performs the second job 504 to update and/or recreate a blacklist table for the one or more vehicle programs of interest.

At 610, the control module 222 checks a NAS folder file name list and compares with previous list from last update for each of multiple vehicle programs. At 612, the control module 222 determines whether there is a newly received and/or different dmi file and/or configuration file. If no, operation 614 is performed, otherwise operation 620 is performed. At 614, the control module 222 determines whether there is a newly received and/or different service tool file. If no, operation 624 may be performed, otherwise operation 616 may be performed.

At 616, the control module 222 performs the first job 502 to add new data to the DTC data table 302 for the vehicle programs of interest. At 618, the control module 222 performs the second job 504 to detect irregularities and adds corresponding data to the blacklist table and/or blacklist rules to the DTC configuration table 300 for the vehicle programs of interest.

At 620, the control module 222 perform the third job 506 to update and/or recreate DTC configuration table 300 for vehicle programs of interest. At 622, the control module 222 perform the second job 504 to update and/or recreate blacklist table 304 for the vehicle programs of interest.

At 624, the control module 222 generate DTC performance analysis reports as disclosed herein. The method may end at 626 subsequent to operation 624.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above examples provide a framework for fleet DTC performance analysis. A cloud-based platform server configured to perform intensive calculations and evaluations to provide improved reporting insight of DTC issues. Functions are implemented for parsing, partitioning and storing DTC configuration information and data. Functions are implemented for extracting configuration information form engineering specifications and converting the specifications to DTC rules (or DTC functions) for data processing. Tables are generated that enable support for different vehicle programs, model years, controllers, etc. Automated and periodic refreshment of the tables is provided including generation of updated DTC performance analysis reports with robust monitoring and debugging functions. The examples include cloud-based systems that aid in detecting and identifying DTC performance issues using vehicle data in the field. The cloud-based system is scalable for different volumes of data and provides comprehensive monitoring for onboard diagnostic vehicle performance.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cloud-based platform server comprising:
a memory configured to store a diagnostic trouble code (DTC) configuration table and a DTC data table, wherein the DTC configuration table comprises DTC rules, and wherein the DTC rules indicate what parameters to monitor and based on what conditions to set one or more DTC status bits;
one or more receiving modules configured to
receive DTC configuration information transmitted from a configuration server to the cloud-based platform server and DTC data uploaded from one or more data servers to the cloud-based platform server, wherein the DTC configuration information includes the DTC rules, DTO attributes, DTC variables, DTC calibration values, and DTC thresholds, and wherein at least some of the DTC data was originally generated by a plurality of vehicles,
based on one or more selected vehicle platforms, parse the DTC configuration information and the DTC data to provide parsed configuration information and parsed DTC data,
convert the parsed DTC configuration information having different formats to a first standardized format and the parsed DTC data having different formats to a second standardized format,
at least one of generate or update the DTC configuration table based on the parsed and converted DTC configuration information, and
at least one of generate or update the DTC data table based on the parsed and converted DTC data and the DTC rules; and
a reporting module configured to, based on the DTC configuration table and the DTC table, generate and download a DTC performance analysis report to one or more user devices.

2. The cloud-based platform server of claim 1, further comprising a blacklist module, wherein:
the memory is configured to store a blacklist table;
the DTC configuration table comprises blacklist rules; and
the blacklist module is configured to, based on the blacklist table and the blacklist rules, limit which data stored as part of the DTC table is permitted to be used in generating the DTC performance analysis report.

3. The cloud-based platform server of claim 2, further comprising a data logging module configured to:
timestamp operations performed by the one or more receiving modules and the blacklist module;
detect one or more irregularities in at least one of (i) the parsed and converted DTC configuration information, and/or (ii) the parsed and converted DTC data; and
generate one or more of the blacklist rules based on the one or more irregularities.

4. The cloud-based platform server of claim 3, further comprising a data debugging and recovery module configured to receive a signal from the data logging module indicating detection of the one or more irregularities, and responsive to the detection, determining the cause of the one or more irregularities and recollecting at least one of DTC configuration information from the configuration server or DTC data from the one or more data servers to replace irregular data associated with the one or more irregularities.

5. The cloud-based platform server of claim 3, wherein the one or more irregularities are detected when at least one of i) values are out of predetermined ranges, ii) values are improper, and iii) values are unrecognizable.

6. The cloud-based platform server of claim 3, wherein the one or more irregularities are detected when a value is expected and a) no value is received or b) unexpected data is received.

7. The cloud-based platform server of claim 3, wherein the one or more irregularities are detected when at least one of i) corrupted data is received, ii) inconsistencies are detected, and iii) duplicate data is received.

8. The cloud-based platform server of claim 3, wherein the one or more irregularities are detected when there is an error in parsing received data.

9. The cloud-based platform server of claim 2, wherein the blacklist table is generated based on the DTC data in the DTC table and the blacklist rules; and the blacklist rules are generated based on Irregularities detected during data logging and debugging.

10. The cloud-based platform server of claim 1, wherein the one or more receiving modules is configured to parse the DTC data received from the one or more data servers based on the DTC configuration information.

11. The cloud-based platform server of claim 1, wherein:
the one or more data servers comprise a plurality of data servers;
the one or more receiving modules comprise a plurality of receiving modules configured to collect respective portions of the DTC data from the plurality of data servers; and
the plurality of receiving modules are configured, based on the parsed and converted DTC configuration information, to parse respective portions of the DTC data received from the plurality of data servers to provide the parsed DTC data.

12. The cloud-based platform server of claim 1, wherein the configuration server is implemented in a cloud-based local area network of the cloud-based platform server.

13. The cloud-based platform server of claim 1, wherein:
the DTC configuration information is uploaded from the configuration server to the cloud-based platform server; and
the configuration server is implemented separate from a cloud-based local area network of the cloud-based platform server.

14. The cloud-based platform server of claim 1, wherein the one or more receiving modules is configured to update the DTC configuration table more frequently than the DTC data table.

15. The cloud-based platform server of claim 1, wherein the one or more receiving modules are configured to update the DTC configuration table monthly and the DTC data table daily.

16. A diagnostic trouble code system comprising:
the cloud-based platform server of claim 1;
the configuration server;
the one or more data servers; and
one or more vehicle data collection tools configured to collect the DTC data from the plurality of vehicles and send the DTC data to the one or more data servers,
wherein
the one or more vehicle data collection tools comprise a plurality of vehicle data collection tools, and
the one or more data servers comprise a plurality of data servers for collecting respective portions of the DTC data from the plurality of vehicle data collection tools.

17. The cloud-based platform server of claim 1, wherein:
the DTC configuration information is for the plurality of vehicles;
the DTC data is for vehicles of the one or more selected vehicle platforms; and
the vehicles of the one or more selected vehicle platforms includes the plurality of vehicles.

18. The cloud-based platform server of claim 1, wherein:
the memory is configured to store a blacklist table;
the blacklist table includes DTC data that is to be ignored and is unable to be removed from the DTC table; and
the blacklist table is created by applying exclusion rules to the DTC table and comprises vehicle identification information, parameters, timestamps, and disable and discard reasons.

19. The cloud-based platform server of claim 1, wherein the one or more receiving modules are configured to:
determine whether the DTC data is from a service tool;
in response to the DTC data being from a service tool, determine at least one of i) whether there is a newly received or different DTC data management interface file, and ii) whether there is a newly received or different configuration file;
in response to there being a newly received or different DTC data management interface file or a newly received or different configuration file, update or recreate i) a DTC configuration table for the one or more selected vehicle platforms and a blacklist table for the one or more selected vehicle platforms; and based on whether there is a newly received or different DTC data management interface file or a newly received or different configuration file, add new DTC data to a DTC data table for the one or more selected vehicle platforms and detect irregularities and add corresponding DTC data to blacklist table for the one or more selected vehicle platforms.

20. A diagnostic trouble code (DTC) performance analysis method comprising:

receiving via one or more receiving modules and at a cloud-based platform server (i) DTC configuration information transmitted from a configuration server to the cloud-based platform server, and (ii) DTC data uploaded from one or more data servers to the cloud-based platform server, wherein the DTC configuration information includes the DTC rules, DTC attributes, DTC variables, DTC calibration values, and DTC thresholds, and wherein the DTC data was originally generated by a plurality of vehicles;

based on one or more selected vehicle platforms, parsing the DTC configuration information and the DTC data to provide parsed configuration information and parsed DTC data;

converting the parsed DTC configuration information of different formats to a first standardized format;

converting the parsed DTC data of different formats to a second standardized format;

at least one of generating or updating a DTC configuration table based on the parsed and converted DTC configuration information, wherein the parsed and converted configuration information includes DTC rules, wherein the DTC configuration table is generated and updated to include the DTC rules, and wherein the DTC rules indicate what parameters to monitor and based on what conditions to set one or more DTC status bits;

at least one of generating or updating a DTC data table based on the parsed and converted DTC data and the DTC rules; and based on the DTC table, generating and downloading a DTC performance analysis report to one or more user devices.

* * * * *